(12) United States Patent
Xu et al.

(10) Patent No.: US 12,463,701 B2
(45) Date of Patent: Nov. 4, 2025

(54) WEARABLE DEVICE

(71) Applicant: Quanta Computer Inc., Taoyuan (TW)

(72) Inventors: Jing-Yao Xu, Taoyuan (TW); Chung-Ting Hung, Taoyuan (TW); Chun-Yuan Wang, Taoyuan (TW); Chu-Yu Tang, Taoyuan (TW); Yi-Chih Lo, Taoyuan (TW); Yu-Chen Zhao, Taoyuan (TW); Chih-Tsung Tseng, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 576 days.

(21) Appl. No.: 18/062,039

(22) Filed: Dec. 6, 2022

(65) Prior Publication Data

US 2024/0129012 A1   Apr. 18, 2024

(30) Foreign Application Priority Data

Oct. 18, 2022   (TW) .................................. 111211331

(51) Int. Cl.
*H04B 7/06* (2006.01)
*G06F 1/16* (2006.01)

(52) U.S. Cl.
CPC ............. *H04B 7/068* (2013.01); *G06F 1/163* (2013.01)

(58) Field of Classification Search
CPC ....... H04B 7/068; G06F 1/163; G06F 1/1698; G04R 60/10; G04G 17/04; H01Q 1/273; H01Q 9/42
See application file for complete search history.

(56) References Cited

U.S. PATENT DOCUMENTS

2024/0030615 A1* 1/2024 Cheng .................... H01Q 5/378

* cited by examiner

*Primary Examiner* — Fred A Casca
(74) *Attorney, Agent, or Firm* — McClure, Qualey & Rodack, LLP

(57) ABSTRACT

A wearable device includes a frame element and a dielectric substrate. The frame element includes a first metal element, a second metal element, and a third metal element. A first gap is provided between the first metal element and the second metal element. A second gap is provided between the second metal element and the third metal element. A third gap is provided between the third metal element and the first metal element. The dielectric substrate is surrounded by the first metal element, the second metal element, and the third metal element. A first antenna element is formed by the first metal element. A second antenna element is formed by the second metal element. A third antenna element is formed by the third metal element.

10 Claims, 6 Drawing Sheets

WEARABLE DEVICE

CROSS REFERENCE TO RELATED APPLICATIONS

This application claims priority of Taiwan Patent Application No. 111211331 filed on Oct. 18, 2022, the entirety of which is incorporated by reference herein.

BACKGROUND OF THE INVENTION

Field of the Invention

The disclosure relates in general to a wearable device, and in particular, to a wearable device and an antenna system therein.

Description of the Related Art

With the advancements being made in mobile communication technology, mobile devices such as portable computers, mobile phones, multimedia players, and other hybrid functional portable electronic devices have become more common. To satisfy consumer demand, mobile devices can usually perform wireless communication functions. Some devices cover a large wireless communication area; these include mobile phones using 2G, 3G, and LTE (Long Term Evolution) systems and using frequency bands of 700 MHz, 850 MHz, 900 MHz, 1800 MHz, 1900 MHz, 2100 MHz, 2300 MHz, and 2500 MHz. Some devices cover a small wireless communication area; these include mobile phones using Wi-Fi systems and using frequency bands of 2.4 GHz, 5.2 GHz, and 5.8 GHz.

Researchers predict that the next generation of mobile devices will be "wearable devices". For example, wireless communication may be applied to watches, glasses, and even clothes in the future. However, watches, for example, do not have a large enough space to accommodate antennas for wireless communication. Therefore, this has become a critical challenge for antenna designers.

BRIEF SUMMARY OF THE INVENTION

In an exemplary embodiment, the invention is directed to a wearable device that includes a frame element and a dielectric substrate. The frame element includes a first metal element, a second metal element, and a third metal element. A first gap is provided between the first metal element and the second metal element. A second gap is provided between the second metal element and the third metal element. A third gap is provided between the third metal element and the first metal element. The dielectric substrate is surrounded by the first metal element, the second metal element, and the third metal element. A first antenna element is formed by the first metal element. A second antenna element is formed by the second metal element. A third antenna element is formed by the third metal element.

In some embodiments, the first antenna element covers a first frequency band and a second frequency band. The first frequency band is from 3300 MHz to 4200 MHz. The second frequency band is from 4400 MHz to 5000 MHz.

In some embodiments, the first metal element includes a first radiation segment, a second radiation segment, and a third radiation segment. The second radiation segment has a first opening. A first feeding point is coupled between the first radiation segment and the second radiation segment. A first grounding point is coupled between the second radiation segment and the third radiation segment.

In some embodiments, the length of the first radiation segment is shorter than or equal to 0.25 wavelength of the second frequency band. The length of the second radiation segment is shorter than or equal to 0.25 wavelength of the first frequency band.

In some embodiments, the second antenna element covers a third frequency band and a fourth frequency band. The third frequency band is from 2400 MHz to 2500 MHz. The fourth frequency band is from 2500 MHz to 2680 MHz.

In some embodiments, the second metal element includes a fourth radiation segment, a fifth radiation segment, and a sixth radiation segment. The fifth radiation segment has a second opening. A second feeding point is coupled between the fourth radiation segment and the fifth radiation segment. A second grounding point is coupled between the fifth radiation segment and the sixth radiation segment.

In some embodiments, the length of the fourth radiation segment is from 0.25 to 0.5 wavelength of the fourth frequency band. The length of the fifth radiation segment is substantially equal to 0.25 wavelength of the third frequency band.

In some embodiments, the wearable device further includes a parasitic metal element disposed on the dielectric substrate. The parasitic metal element is coupled to the fifth radiation segment. The parasitic metal element is configured to increase the bandwidth of the third frequency band and the bandwidth of the fourth frequency band.

In some embodiments, the third antenna element covers a fifth frequency band, and the fifth frequency band is substantially at 1575 MHz.

In some embodiments, the length of the third metal element is shorter than or equal to 0.25 wavelength of the fifth frequency band.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1A:
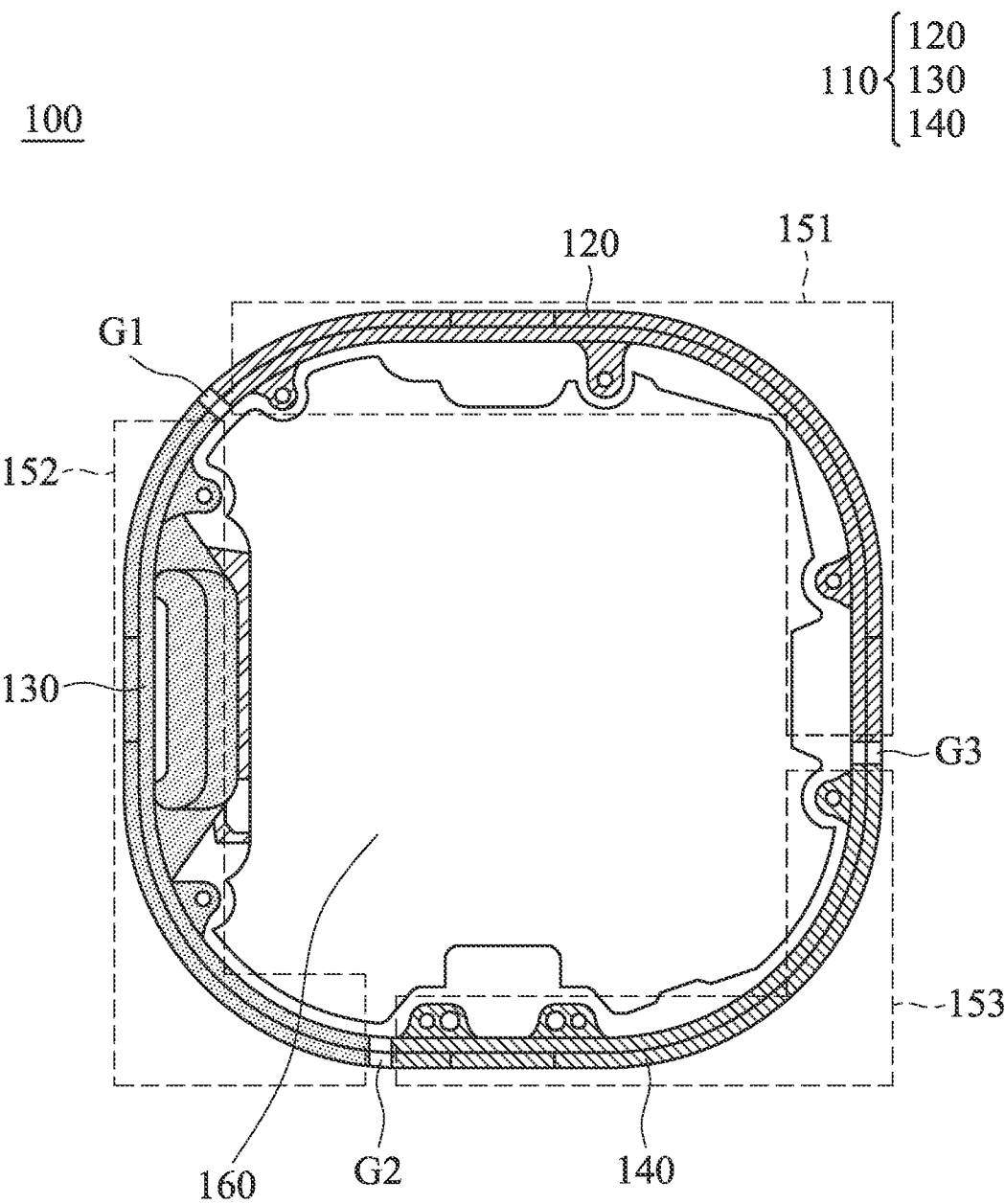
FIG. 1A is a front view of a wearable device according to an embodiment of the invention.

In order to illustrate the purposes, features and advantages of the invention, the embodiments and figures of the invention are shown in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Furthermore, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Figure 1B:
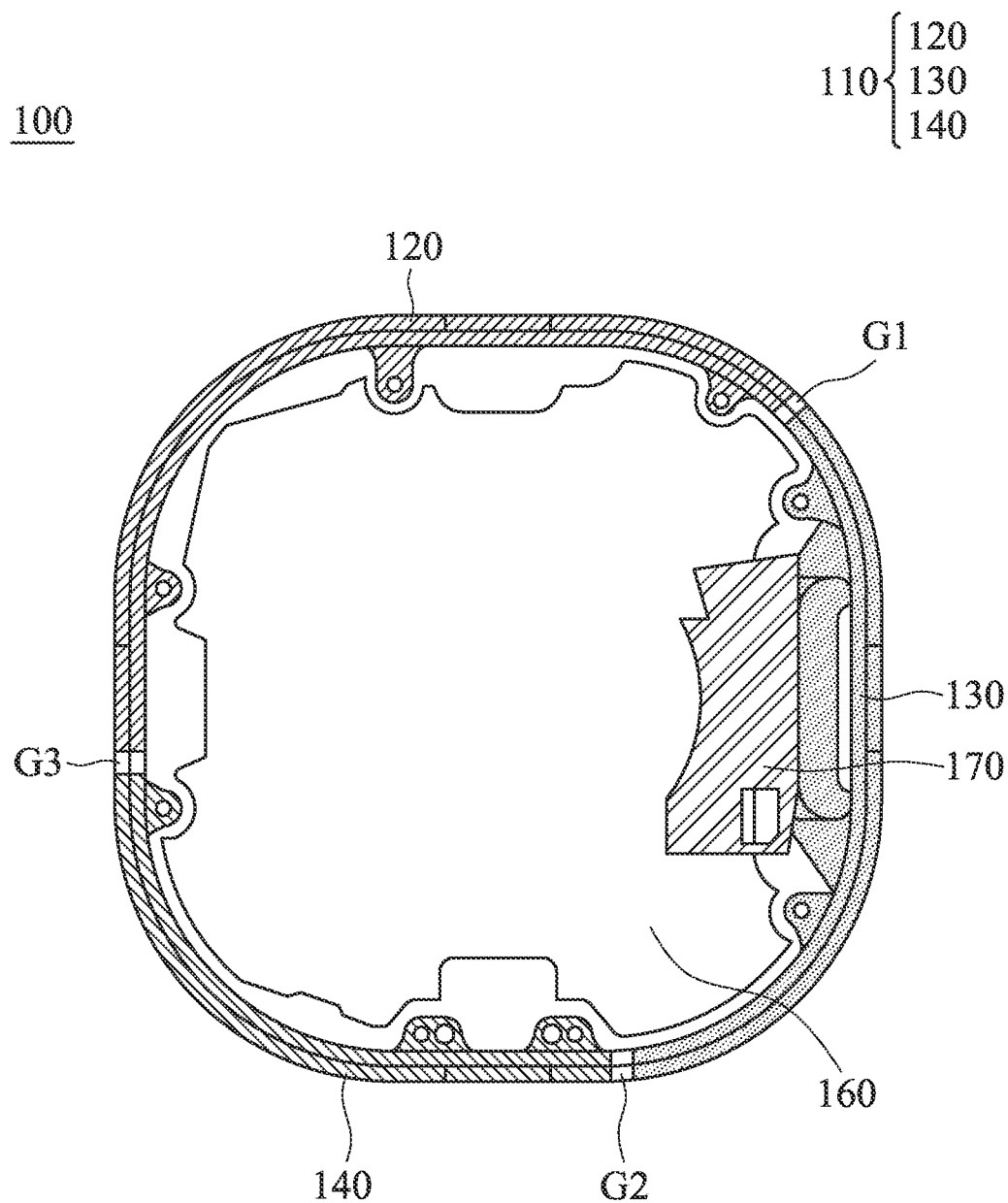
FIG. 1B is a back view of a wearable device according to an embodiment of the invention.

FIG. 1A is a front view of a wearable device 100 according to an embodiment of the invention. FIG. 1B is a back view of the wearable device 100 according to an embodiment of the invention. Please refer to FIG. 1A and FIG. 1B together. In some embodiments, the wearable device 100 is a wrist-wearable device, such as a smart watch or a smart sporty bracelet.

As shown in FIG. 1A and FIG. 1B, the wearable device 100 at least includes a frame element 110 and a dielectric substrate 160. The shapes and styles of the frame element 110 and the dielectric substrate 160 are not limited in the invention. It should be understood that the wearable device 100 may further include other components, such as a battery, an hour hand, a minute hand, a second hand, a signal processing module, a counter, a processor, a thermometer, a barometer, a time adjuster, a connection belt, a waterproof housing, and/or a buckle, although these components are not displayed in FIG. 1A and FIG. 1B.

The frame element 110 includes a first metal element 120, a second metal element 130, and a third metal element 140. A first gap G1 may be provided between the first metal element 120 and the second metal element 130. A second gap G2 may be provided between the second metal element 130 and the third metal element 140. A third gap G3 may be provided between the third metal element 140 and the first metal element 120. Therefore, it is considered that the frame element 110 includes three metal elements which are separate from each other.

The dielectric substrate 160 is surrounded by the first metal element 120, the second metal element 130, and the third metal element 140 of the frame element 110. For example, the dielectric substrate 160 may be an FR4 (Flame Retardant 4) substrate, a PCB (Printed Circuit Board), or an FPC (Flexible Printed Circuit), but it is not limited thereto.

In a preferred embodiment, a first antenna element 151 is formed by the first metal element 120, a second antenna element 152 is formed by the second metal element 130, and a third antenna element 153 is formed by the third metal element 140. The first antenna element 151, the second antenna element 152, and the third antenna element 153 can cover different operational frequency bands. The shapes and types of the first antenna element 151, the second antenna element 152, and the third antenna element 153 are not limited in the invention. For example, any of the first antenna element 151, the second antenna element 152, and the third antenna element 153 may be a monopole antenna, a dipole antenna, a hybrid antenna, or an IFA (Inverted-F Antenna). Since the above antenna elements are integrated with the frame element 110 of the wearable device 100, the wearable device 100 can cover the wideband operations of multiple frequency bands, without additionally increasing the whole device size.

The following embodiments will introduce different configurations and detailed structural features of the wearable device 100. It should be understood that these figures and descriptions are merely exemplary, rather than limitations of the invention.

Figure 2:
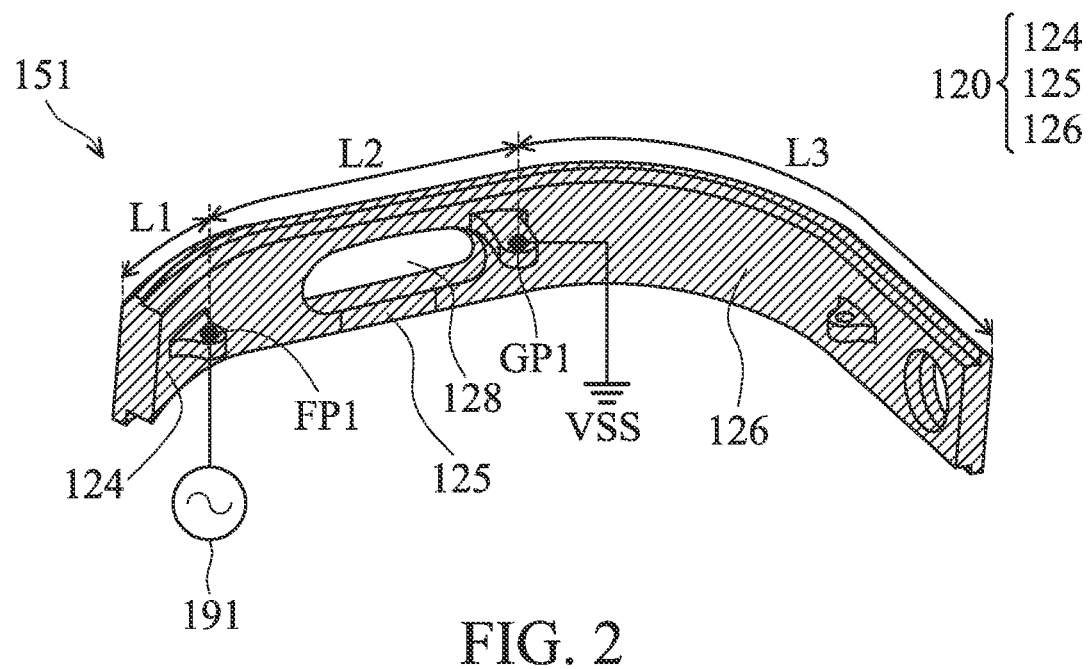
FIG. 2 is a perspective view of a first antenna element according to an embodiment of the invention.

FIG. 2 is a perspective view of the first antenna element 151 according to an embodiment of the invention. In the embodiment of FIG. 2, the first antenna element 151 includes the first metal element 120, and the first metal element 120 includes a first radiation segment 124, a second radiation segment 125, and a third radiation segment 126. A first feeding point FP1 is coupled between the first radiation segment 124 and the second radiation segment 125. The first feeding point FP1 may be further coupled to a first signal source 191. For example, the first signal source 191 may be an RF (Radio Frequency) module for exciting the first antenna element 151. The second radiation segment 125 has a first opening 128. For example, the first opening 128 may substantially have a circular shape or an elliptical shape for accommodating a physical button (not shown). In addition, a first grounding point GP1 is coupled between the second radiation segment 125 and the third radiation segment 126. The first grounding point GP1 may be further coupled to a ground voltage VSS. For example, the ground voltage VSS may be provided by a system ground plane disposed on the dielectric substrate 160 (not shown).

Figure 3:
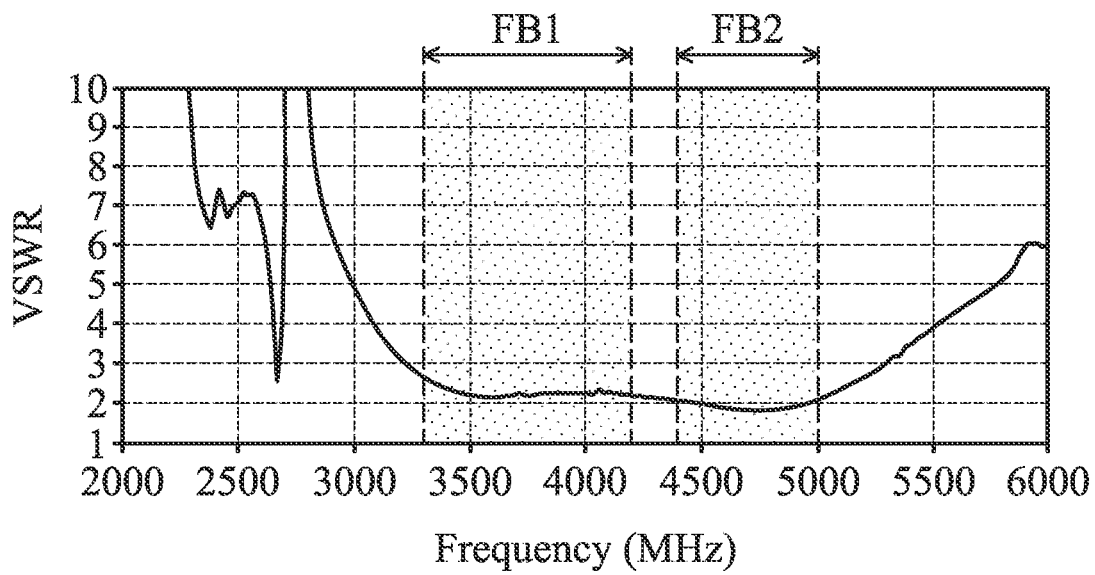
FIG. 3 is a diagram of VSWR (Voltage Standing Wave Ratio) of a first antenna element according to an embodiment of the invention.

FIG. 3 is a diagram of VSWR (Voltage Standing Wave Ratio) of the first antenna element 151 according to an embodiment of the invention. The horizontal axis represents the operational frequency (MHz), and the vertical axis represents the VSWR. According to the measurement of FIG. 3, the first antenna element 151 can cover a first frequency band FB1 and a second frequency band FB2. For example, the first frequency band FB1 may be from 3300 MHz to 4200 MHz, and the second frequency band FB2 may be from 4400 MHz to 5000 MHz. Therefore, the first antenna element 151 can support at least the sub-6 GHz wideband operations of next-generation 5G (5th Generation Wireless System).

In some embodiments, the operational principles of the first antenna element 151 will be described as follows. The first radiation segment 124 is excited to generate the aforementioned second frequency band FB2. The second radiation segment 125 is excited to generate the aforementioned first frequency band FB1. In addition, the third radiation segment 126 is configured to fine-tune the impedance matching of the aforementioned first frequency band FB1.

In some embodiments, the element sizes of the first antenna element 151 will be described as follows. The length L1 of the first radiation segment 124 may be shorter than or equal to 0.25 wavelength ($\lambda/4$) of the second frequency band FB2 of the first antenna element 151. The length L2 of the second radiation segment 125 may be shorter than or equal to 0.25 wavelength ($\lambda/4$) of the first frequency band FB1 of the first antenna element 151. The length L3 of the third radiation segment 126 may be longer than the length L1 of the first radiation segment 124. Also, the length L3 of the third radiation segment 126 may be longer than the length L2 of the second radiation segment 125. The width of the first gap G1 may be from 1 mm to 2 mm. The above ranges of element sizes are calculated and obtained according to many experiment results, and they help to optimize the operational bandwidth and the impedance matching of the first antenna element 151.

Figure 4:
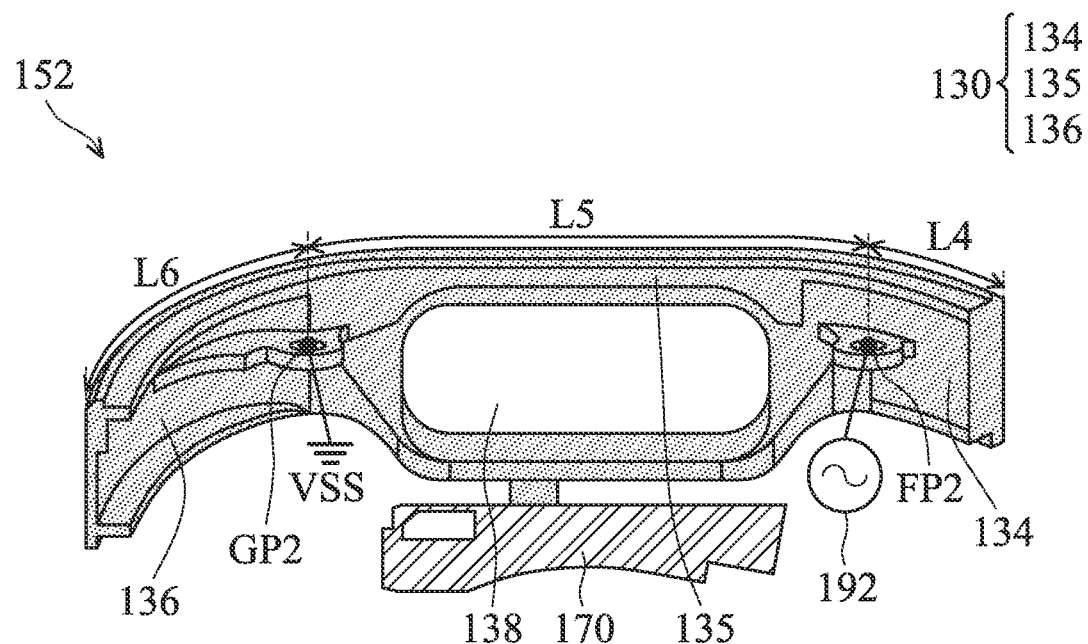
FIG. 4 is a perspective view of a second antenna element according to an embodiment of the invention.

FIG. 4 is a perspective view of the second antenna element 152 according to an embodiment of the invention. In the embodiment of FIG. 4, the second antenna element 152 includes the second metal element 130, and the second metal element 130 includes a fourth radiation segment 134, a fifth radiation segment 135, and a sixth radiation segment 136. A second feeding point FP2 is coupled between the fourth radiation segment 134 and the fifth radiation segment 135. The second feeding point FP2 may be further coupled to a second signal source 192. For example, the second signal source 192 may be another RF module for exciting the second antenna element 152. The fifth radiation segment 135 has a second opening 138. For example, the second opening 138 may substantially have a circular shape or a rectangular shape for accommodating a speaker (not shown). In addition, a second grounding point GP2 is coupled between the fifth radiation segment 135 and the sixth radiation segment 136. The second grounding point GP2 may be further coupled to the ground voltage VSS.

Figure 5:
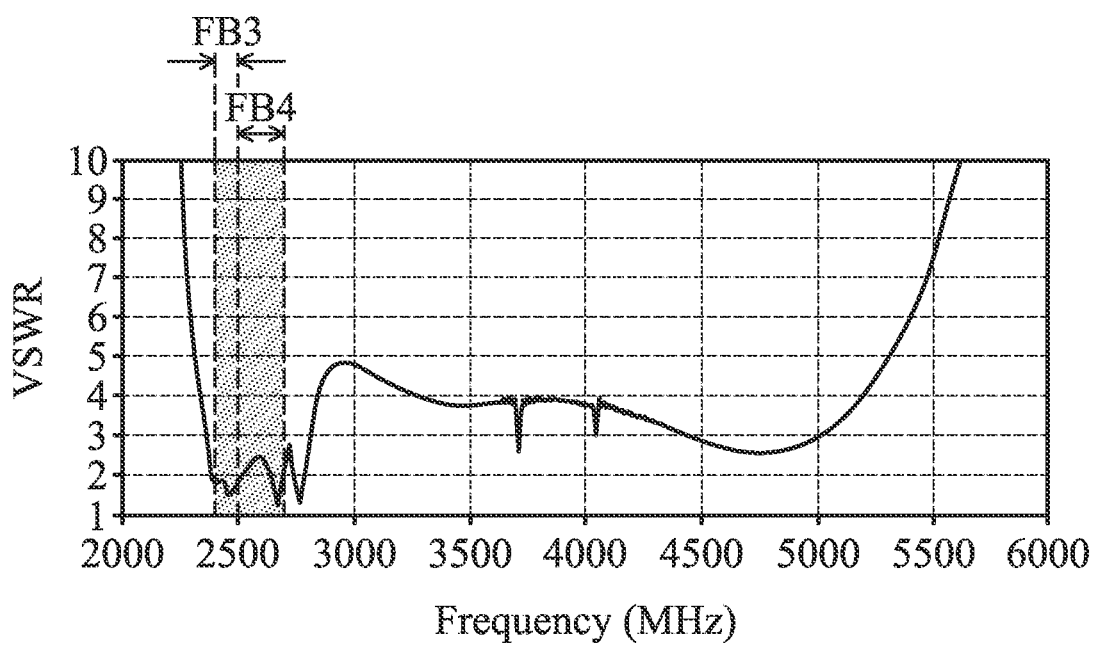
FIG. 5 is a diagram of VSWR of a second antenna element according to an embodiment of the invention.

FIG. 5 is a diagram of VSWR of the second antenna element 152 according to an embodiment of the invention. The horizontal axis represents the operational frequency (MHz), and the vertical axis represents the VSWR. According to the measurement of FIG. 5, the second antenna element 152 can cover a third frequency band FB3 and a fourth frequency band FB4. For example, the third frequency band FB3 may be from 2400 MHz to 2500 MHz, and the fourth frequency band FB4 may be from 2500 MHz to 2680 MHz. Therefore, the second antenna element 152 can support at least the wideband operations of WLAN (Wireless Local Area Network).

In some embodiments, the operational principles of the second antenna element 152 will be described as follows. The fourth radiation segment 134 is excited to generate the aforementioned fourth frequency band FB4. The fifth radiation segment 135 is excited to generate the aforementioned third frequency band FB3. In addition, the sixth radiation segment 136 is configured to fine-tune the impedance matching of the aforementioned third frequency band FB3.

In some embodiments, the element sizes of the second antenna element 152 will be described as follows. The length L4 of the fourth radiation segment 134 may be from 0.25 to 0.5 wavelength ($\lambda/4 \sim \lambda/2$) of the fourth frequency band FB4 of the second antenna element 152. The length L5 of the fifth radiation segment 135 may be substantially equal to 0.25 wavelength ($\lambda/4$) of the third frequency band FB3 of the second antenna element 152. The length L6 of the sixth radiation segment 136 may be longer than the length L4 of the fourth radiation segment 134. The length L6 of the sixth radiation segment 136 may be shorter than the length L5 of the fifth radiation segment 135. The width of the second gap G2 may be from 1 mm to 2 mm. The above ranges of element sizes are calculated and obtained according to many experiment results, and they help to optimize the operational bandwidth and the impedance matching of the second antenna element 152.

Figure 6:
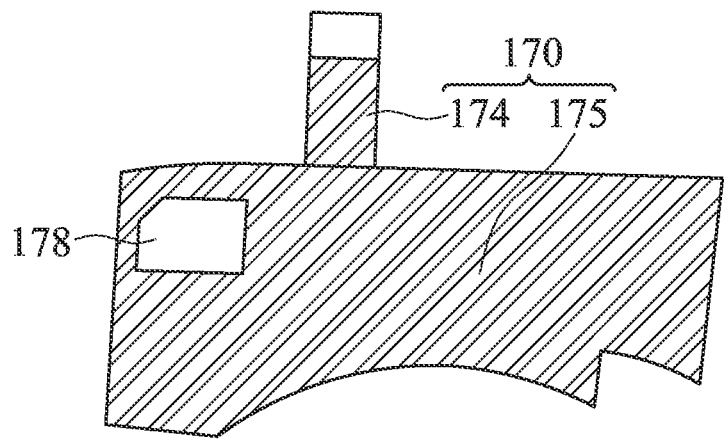
FIG. 6 is a top view of a parasitic metal element according to an embodiment of the invention.

FIG. 6 is a top view of a parasitic metal element 170 according to an embodiment of the invention. In the embodiment of FIG. 6, the wearable device 100 further includes the parasitic metal element 170 disposed on the dielectric substrate 160. The parasitic metal element 170 is considered as an extension portion of the second antenna element 152. Specifically, the parasitic metal element 170 includes a connection portion 174 and a main portion 175, and the main portion 175 is coupled through the connection portion 174 to the fifth radiation segment 135. In addition, the main portion 175 of the parasitic metal element 170 further has a third opening 178 for accommodating a magnetic element (not shown). According to practical measurements, the incorporation of the parasitic metal element 170 can increase the bandwidth of the third frequency band FB3 and the bandwidth of the fourth frequency band FB4 of the second antenna element 152. It should be understood that the parasitic metal element 170 is merely an optional component, and it may be omitted in other embodiments.

Figure 7:
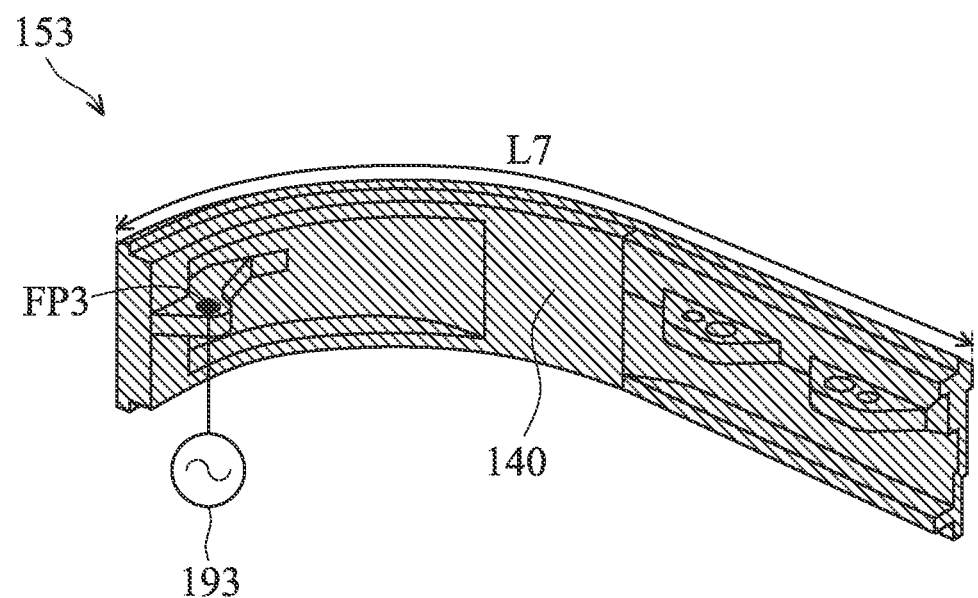
FIG. 7 is a perspective view of a third antenna element according to an embodiment of the invention.

FIG. 7 is a perspective view of the third antenna element 153 according to an embodiment of the invention. In the embodiment of FIG. 7, the third antenna element 153 includes the third metal element 140. A third feeding point FP3 is coupled to one end of the third metal element 140, and the other end of the third metal element 140 is an open end. The third feeding point FP3 may be further coupled to a third signal source 193. For example, the third signal source 193 may be another RF module for exciting the third antenna element 153.

Figure 8:
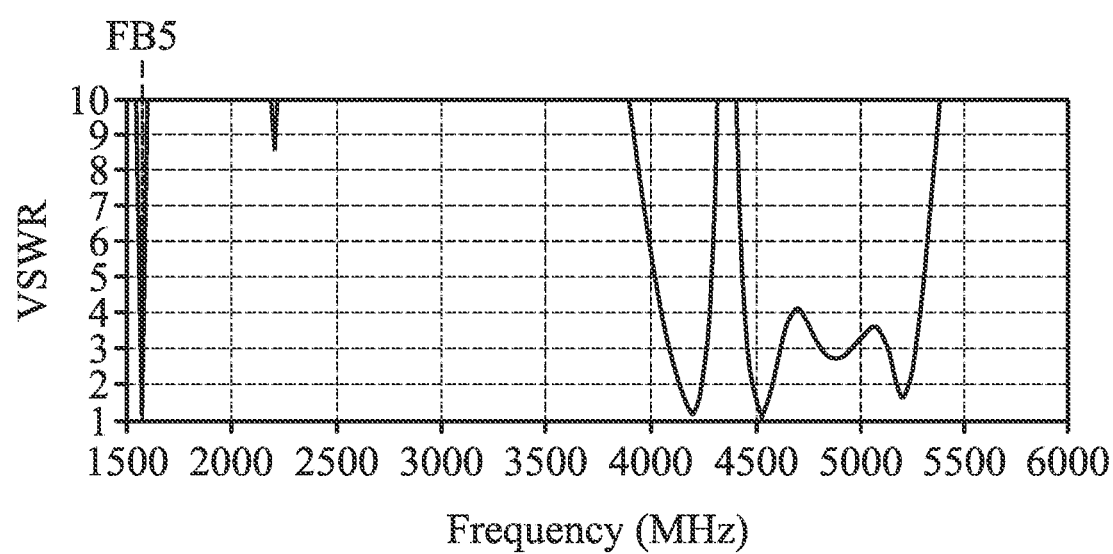
FIG. 8 is a diagram of VSWR of a third antenna element according to an embodiment of the invention.

FIG. 8 is a diagram of VSWR of the third antenna element 153 according to an embodiment of the invention. The horizontal axis represents the operational frequency (MHz), and the vertical axis represents the VSWR. According to the measurement of FIG. 8, the third antenna element 153 can cover a fifth frequency band FB5. For example, the fifth frequency band FB5 may be substantially at 1575 MHz. Therefore, the third antenna element 153 can support the function of GPS (Global Positioning System).

In some embodiments, the operational principles of the third antenna element 153 will be described as follows. The third metal element 140 is excited to generate the aforementioned fifth frequency band FB5.

In some embodiments, the element sizes of the third antenna element 153 will be described as follows. The length L7 of the third metal element 140 may be shorter than or equal to 0.25 wavelength ($\lambda/4$) of the fifth frequency band FB5 of the third antenna element 153. The width of the third gap G3 may be from 1 mm to 2 mm. The above ranges of element sizes are calculated and obtained according to many experiment results, and they help to optimize the operational bandwidth and the impedance matching of the third antenna element 153.

The invention proposes a novel wearable device. In comparison to the conventional design, the invention has at least the advantages of: (1) using a frame element of the wearable device to form an antenna system, (2) not occupying additional internal space of the wearable device, (3) minimizing the whole antenna size, and (4) reducing the whole manufacturing cost. Therefore, the invention is suitable for application in a variety of small-size wearable devices with communication functions.

Note that the above element sizes, element shapes, and frequency ranges are not limitations of the invention. An antenna designer can fine-tune these settings or values according to different requirements. It should be understood that the wearable device of the invention is not limited to the configurations of FIGS. 1-8. The invention may merely include any one or more features of any one or more embodiments of FIGS. 1-8. In other words, not all of the features displayed in the figures should be implemented in the wearable device of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A wearable device, comprising:
   a frame element, comprising a first metal element, a second metal element, and a third metal element, wherein a first gap is provided between the first metal element and the second metal element, a second gap is provided between the second metal element and the third metal element, and a third gap is provided between the third metal element and the first metal element; and
   a dielectric substrate, wherein the dielectric substrate is surrounded by the first metal element, the second metal element, and the third metal element;
   wherein a first antenna element is formed by the first metal element;
   wherein a second antenna element is formed by the second metal element; and
   wherein a third antenna element is formed by the third metal element.

2. The wearable device as claimed in claim 1, wherein the first antenna element covers a first frequency band and a second frequency band, the first frequency band is from 3300 MHz to 4200 MHz, and the second frequency band is from 4400 MHz to 5000 MHz.

3. The wearable device as claimed in claim 2, wherein the first metal element comprises:
   a first radiation segment;
   a second radiation segment, having a first opening, wherein a first feeding point is coupled between the first radiation segment and the second radiation segment; and
   a third radiation segment, wherein a first grounding point is coupled between the second radiation segment and the third radiation segment.

4. The wearable device as claimed in claim 3, wherein a length of the first radiation segment is shorter than or equal to 0.25 wavelength of the second frequency band, and a length of the second radiation segment is shorter than or equal to 0.25 wavelength of the first frequency band.

5. The wearable device as claimed in claim 1, wherein the second antenna element covers a third frequency band and a fourth frequency band, the third frequency band is from 2400 MHz to 2500 MHz, and the fourth frequency band is from 2500 MHz to 2680 MHz.

6. The wearable device as claimed in claim 5, wherein the second metal element comprises:
   a fourth radiation segment;
   a fifth radiation segment, having a second opening, wherein a second feeding point is coupled between the fourth radiation segment and the fifth radiation segment; and
   a sixth radiation segment, wherein a second grounding point is coupled between the fifth radiation segment and the sixth radiation segment.

7. The wearable device as claimed in claim 6, wherein a length of the fourth radiation segment is from 0.25 to 0.5 wavelength of the fourth frequency band, and a length of the fifth radiation segment is substantially equal to 0.25 wavelength of the third frequency band.

8. The wearable device as claimed in claim 6, further comprising:
   a parasitic metal element, disposed on the dielectric substrate, and coupled to the fifth radiation segment, wherein the parasitic metal element is configured to increase bandwidth of the third frequency band and bandwidth of the fourth frequency band.

9. The wearable device as claimed in claim 1, wherein the third antenna element covers a fifth frequency band, and the fifth frequency band is substantially at 1575 MHz.

10. The wearable device as claimed in claim 9, wherein a length of the third metal element is shorter than or equal to 0.25 wavelength of the fifth frequency band.

* * * * *